(12) United States Patent
Kondo et al.

(10) Patent No.: US 10,840,522 B2
(45) Date of Patent: Nov. 17, 2020

(54) FUEL CELL

(71) Applicants: TOYOTA SHATAI KABUSHIKI KAISHA, Kariya (JP); TOYOTA JIDOSHA KABUSHIKI KAISHA, Toyota (JP)

(72) Inventors: Takashi Kondo, Kariya (JP); Keiji Hashimoto, Kariya (JP); Daisuke Kanno, Toyota (JP)

(73) Assignees: TOYOTA SHATAI KABUSHIKI KAISHA, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 15/800,850

(22) Filed: Nov. 1, 2017

(65) Prior Publication Data

US 2018/0145352 A1 May 24, 2018

(30) Foreign Application Priority Data

Nov. 22, 2016 (JP) .................................. 2016-227051

(51) Int. Cl.
*H01M 8/04119* (2016.01)
*H01M 8/0258* (2016.01)
(Continued)

(52) U.S. Cl.
CPC ..... *H01M 8/04156* (2013.01); *H01M 8/0258* (2013.01); *H01M 8/0267* (2013.01); *H01M 8/04119* (2013.01); *H01M 2008/1095* (2013.01)

(58) Field of Classification Search
CPC ....... H01M 2008/1095; H01M 8/0258; H01M 8/0267; H01M 8/04119; H01M 8/04156
See application file for complete search history.

(56) References Cited

U.S. PATENT DOCUMENTS

2003/0124407 A1 7/2003 Tanaka et al.
2005/0095492 A1* 5/2005 Frank ................. H01M 8/2465
429/434
(Continued)

FOREIGN PATENT DOCUMENTS

JP 2003-203669 A 7/2003
JP 2008-053197 A 3/2008
(Continued)

OTHER PUBLICATIONS

Jul. 5, 2019 Office Action issued in German Patent Application No. 10 2017 125 928.7.
(Continued)

*Primary Examiner* — Victoria H Lynch
(74) *Attorney, Agent, or Firm* — Oliff PLC

(57) ABSTRACT

A fuel cell includes stacked power cells and an end cell. Each power cell includes a first plate and two first separators sandwiching the first plate. The end cell includes a second plate and two second separators sandwiching the second plate. Through holes formed in each plate and each separator form a power generating gas inlet passage extending in the power cells. The end cell has at least one of a "first structure," in which a bottom wall of the through hole of the second plate or an upstream one of the second separators is downwardly recessed compared to corresponding portions of the power cells, and a "second structure," in which a bottom wall of the through hole of the second plate or a downstream one of the second separators upwardly projects compared to corresponding portions of the power cells.

5 Claims, 13 Drawing Sheets

(51) Int. Cl.
*H01M 8/0267* (2016.01)
*H01M 8/1018* (2016.01)

(56) References Cited

U.S. PATENT DOCUMENTS

| | | | |
|---|---|---|---|
| 2009/0325016 A1 | 12/2009 | Yamashita et al. | |
| 2010/0136445 A1* | 6/2010 | Morita | H01M 8/04223 |
| | | | 429/428 |

FOREIGN PATENT DOCUMENTS

| | | |
|---|---|---|
| JP | 2009-164051 A | 7/2009 |
| JP | 2010-282866 A | 12/2010 |
| WO | 2008/050816 A1 | 5/2008 |

OTHER PUBLICATIONS

Nov. 5, 2019 Office Action issued in Japanese Patent Application No. 2016-227051.

* cited by examiner

FUEL CELL

BACKGROUND OF THE INVENTION

The present invention relates to a fuel cell that includes a plurality of stacked cells.

A power generation cell of a polymer electrolyte fuel cell includes a membrane electrode assembly (so-called MEA) and two separators sandwiching the membrane electrode assembly. The membrane electrode assembly has a structure in which an electrolyte membrane formed by an ion exchange membrane is sandwiched between two electrodes. One of the separators and the membrane electrode assembly define a gas flow passage therebetween, to which a fuel gas (e.g., hydrogen gas) is supplied. The other separator and the membrane electrode assembly define another gas flow passage therebetween, to which an oxidation gas (e.g., air) is supplied.

A fuel cell generally has a structure in which a plurality of power generation cells is stacked. Inside the fuel cell, an inlet passage is arranged to distribute a power generating gas to the gas flow passages of each power generation cell so that the power generating gas flows into the gas flow passages, and an outlet passage is arranged to join and discharge the power generating gas that has passed through the gas flow passages.

Japanese Laid-Open Patent Publication No. 2009-164051 discloses one example of such a fuel cell. The fuel cell includes end cells located at each end in a direction in which power generation cells are stacked. An end cell includes, for example, a plate and two separators sandwiching the plate. The plate and each of the two separators define a bypass flow passage therebetween, which communicates the inlet passage and the outlet passage to allow the power generating gas to flow through.

The end cells, which do not have a structure for generating power, produce a heat insulating effect at the ends in the stacking direction of the power generation cells. The end cells limit a decrease in temperature of the power generation cells located at the ends in the stacking direction. Thus, production of water caused by, for example, condensation is limited in the power generation cells.

SUMMARY OF THE INVENTION

In addition to the production of water in the power generation cells, water may also be produced in a gas supply passage that supplies the power generating gas into the fuel cell from outside the fuel cell. If water in the gas supply passage is forced by, for example, a gas flow into the power generation cells and remains in the power generation cells, the amount of gas supplied to the membrane electrode assembly may be reduced. This adversely affects the power generation efficiency.

It is an object of the present invention to provide a fuel cell that limits entrance of water into power generation cells.

One aspect of the present invention is a fuel cell that includes a plurality of stacked power generation cells and at least one end cell located at an end in a stacking direction of the power generation cells. Each power generation cell includes a first plate including a membrane electrode assembly, a first pair of separators sandwiching the first plate, and a first flow passage formed between the first plate and the first pair of separators to allow a power generating gas to pass through. The end cell includes a second plate, a second pair of separators sandwiching the second plate, and a second flow passage formed between the second plate and the second pair of separators to allow the power generating gas to pass through. The fuel cell further includes an inlet passage formed by through holes formed in the first pair of separators, the first plate, the second pair of separators, and the second plate. The inlet passage extends in the stacking direction and distributes the power generating gas to the first flow passage and the second flow passage so that the power generating gas flows into the first flow passage and the second flow passage. The end cell has at least one of a "first structure" and a "second structure." In the "first structure," at least one of the through hole formed in one separator of the second pair of separators located at an upstream side in a gas flow direction and the through hole formed in the second plate has a bottom wall that is downwardly recessed compared to a corresponding portion of each power generation cell. In the "second structure," at least one of the through hole formed in the second plate and the through hole formed in one separator of the second pair of separators located at a downstream side in the gas flow direction has a bottom wall that upwardly projects compared to a corresponding portion of each power generation cell.

In the above fuel cell, the end cell located at an end in the stacking direction may have a gas supply passage connected thereto to allow the power generating gas to flow into the inlet passage from outside the inlet passage and may have at least one of the "first structure" and the "second structure."

In the above fuel cell, the end cell may have the "second structure." At least one of the bottom wall of the through hole formed in the second plate and the bottom wall of the through hole formed in the one separator of the second pair of separators located at the downstream side in the gas flow direction may be located above a maximum water level of water entering the inlet passage.

In the above fuel cell, the second flow passage of the end cell may include a plurality of branch passages individually communicated to the inlet passage. A lower one of the branch passages may have a smaller pressure loss than an upper one of the branch passages.

In the end cell, an end portion of the lower one of the branch passages located toward the inlet passage may have an upper end located above a maximum water level of water entering the inlet passage.

Other aspects and advantages of the embodiments will become apparent from the following description, taken in conjunction with the accompanying drawings, illustrating by way of example the principles of the invention.

DETAILED DESCRIPTION OF THE PREFERRED EMBODIMENTS

One embodiment of a fuel cell will now be described with reference to the drawings.

The schematic structure of the fuel cell will now be described.

Figure 1:
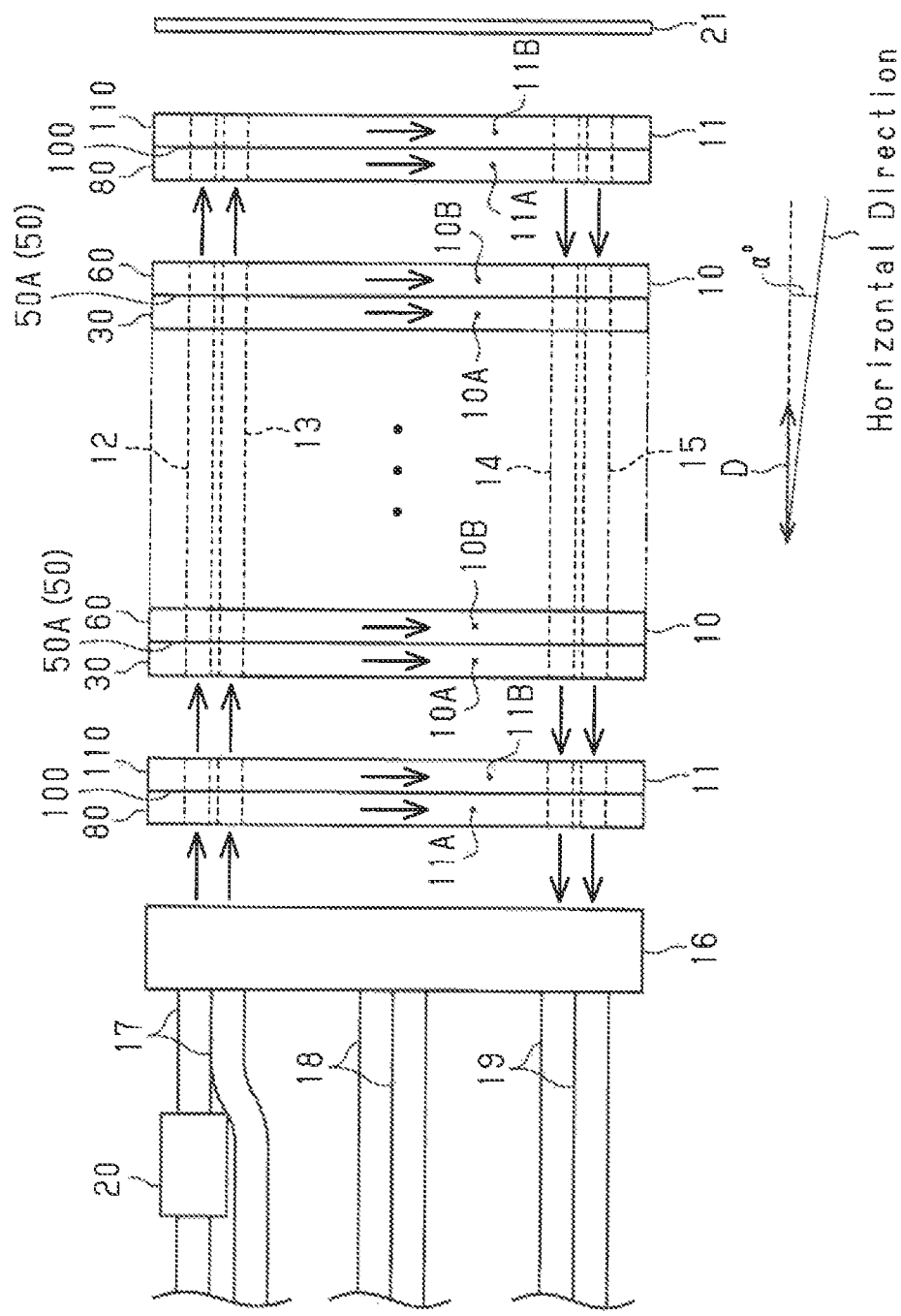
FIG. 1 is a schematic view showing an exploded structure of one embodiment of a fuel cell.

As shown in FIG. 1, the fuel cell includes a plurality of stacked power generation cells 10 (330 cells in the present embodiment) and two end cells 11 arranged to sandwich the power generation cells 10 in a stacking direction D of the power generation cells 10 (sideward direction in FIG. 1).

The fuel cell includes a hydrogen gas inlet passage 12, which distributes hydrogen gas to each power generation cell 10 and each end cell 11 so that the hydrogen gas flows into the power generation cells 10 and the end cells 11, and an air inlet passage 13, which distributes air to each power generation cell 10 and each end cell 11 so that the air flows into the power generation cells 10 and the end cells 11. The fuel cell further includes a hydrogen gas outlet passage 14, which joins and discharges the hydrogen gas that has passed through the power generation cells 10 and the end cells 11, and an air outlet passage 15, which joins and discharges the air that has passed through the power generation cells 10 and the end cells 11. The fuel cell further includes a coolant inlet passage (not shown), which allow a coolant to flow into gaps between adjacent ones of the power generation cells 10 and between each end cell 11 and an adjacent power generation cell 10, and a coolant outlet passage (not shown), which join and discharge the coolant.

A stack manifold 16 is attached to one of the two end cells 11 (left in FIG. 1) to cover an end surface of the end cell 11 located at an outer side in the stacking direction D. The stack manifold 16 is connected to hydrogen gas pipes 17, air pipes 18, and coolant pipes 19, which supply and discharge hydrogen gas, oxygen gas (more specifically, air), and the coolant, respectively. In the fuel cell, the supply of hydrogen gas to the hydrogen gas inlet passage 12, the supply of air to the air inlet passage 13, the discharge of hydrogen gas out of the hydrogen gas outlet passage 14, the discharge of air out of the air outlet passage 15, the supply of the coolant to the coolant inlet passage, and the discharge of the coolant out of the coolant outlet passage are performed via the stack manifold 16. A humidifier 20 is arranged in one of the hydrogen gas pipes 17 at an upstream side of the stack manifold 16 to humidify hydrogen gas. In the present embodiment, the stack manifold 16 and one of the hydrogen gas pipes 17 correspond to a gas supply passage that allows hydrogen gas to flow into the hydrogen gas inlet passage 12 from outside the hydrogen gas inlet passage 12.

An end plate 21 is attached to the other one of the two end cells 11 (right in FIG. 1) to cover an end surface of the end cell 11 located at an outer side in the stacking direction D. The end plate 21 closes the opening of each fluid passage (hydrogen gas inlet passage 12, air inlet passage 13, hydrogen gas outlet passage 14, air outlet passage 15, coolant inlet passage, and coolant outlet passage) located in the end surface of the end cell 11.

The fuel cell of the present embodiment is installed to an electric automobile as a power supply in a state inclined by a predetermined angle α (a few degrees in the present embodiment) so that the end of the fuel cell located toward the stack manifold 16 in the stacking direction D is located at a lower position. When the fuel cell is installed in such an inclined state, the hydrogen gas outlet passage 14 is inclined so that the hydrogen gas outlet passage 14 extends gradually downward toward the stack manifold 16. This facilitates the discharging of water out of the hydrogen gas outlet passage 14.

The structure of the power generation cells 10 will now be described.

Each power generation cell 10 includes a membrane electrode assembly 50A. The membrane electrode assembly 50A has a five-layer structure that includes an electrolyte membrane, which is a polymer membrane, two electrodes sandwiching the electrolyte membrane, and two gas diffusion layers, which are formed by carbon sheets sandwiching the electrolyte membrane and the two electrodes. The power generation cell 10 has a structure in which a flat frame plate 50 is sandwiched between a first upstream separator 30 and a first downstream separator 60. The membrane electrode assembly 50A forms a central portion of the frame plate 50. The remaining portion of the frame plate 50 is formed by an insulator.

Figure 2:
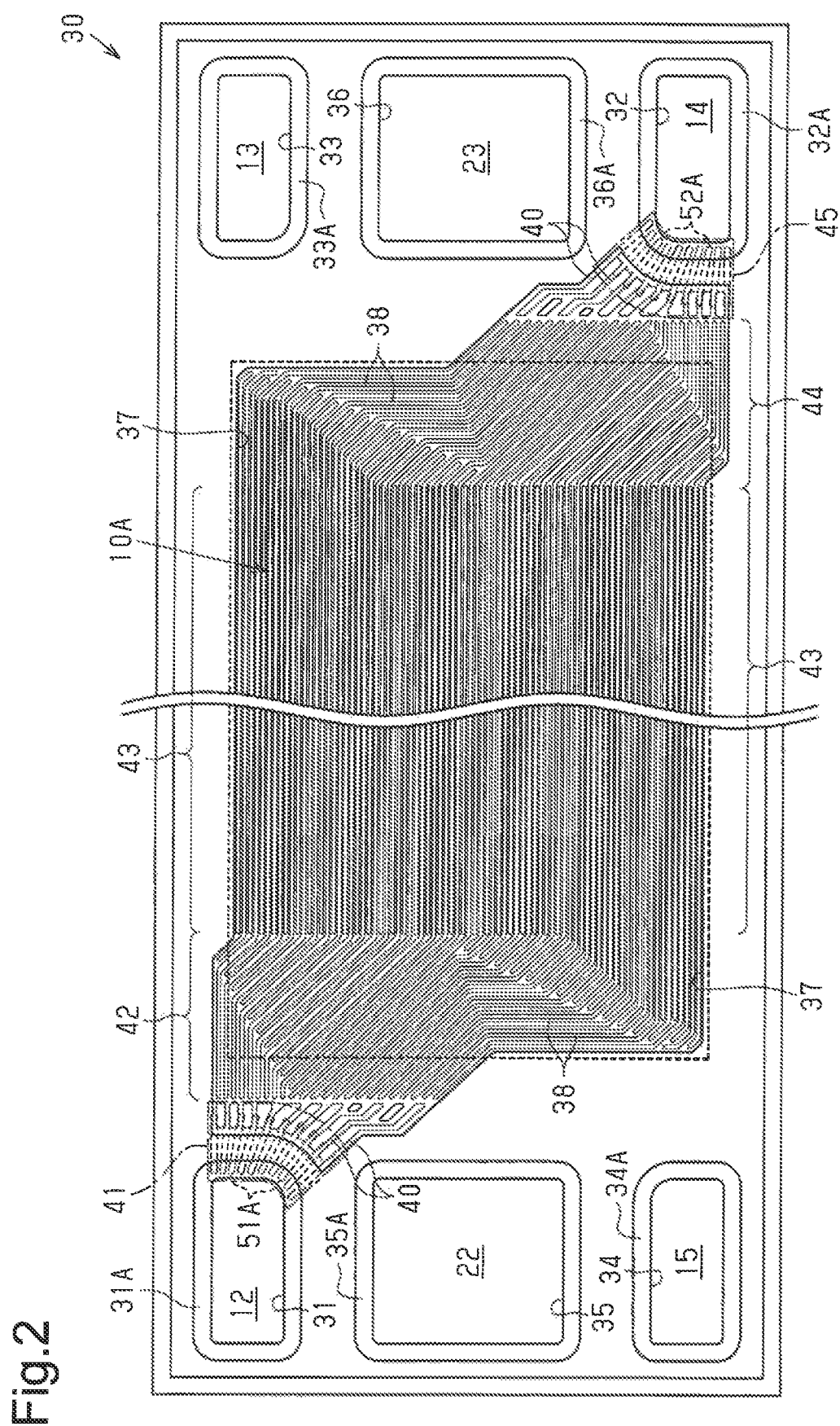
FIG. 2 is a plan view showing a first upstream separator of a power generation cell.

As shown in FIG. 2, the first upstream separator 30 is a thin metal plate member that has been pressed to have irregularities. The irregularities function to define first flow passages (hydrogen gas flow passages 10A), which allow the hydrogen gas to pass through the power generation cell 10, and a coolant flow passage, which allows the coolant to flow through a gap between adjacent ones of the power generation cells 10. FIG. 2 shows the surface of the first upstream separator 30 facing the frame plate 50 (refer to FIG. 1).

The first upstream separator 30 includes through holes 31 to 36. The through hole 31 extends through an upper portion of one longitudinal side (upper left portion in FIG. 2) of the first upstream separator 30 and forms a portion of the hydrogen gas inlet passage 12. The longitudinal direction conforms to the sideward direction in FIG. 2. The through hole 32 extends through a lower portion of the other longitudinal side (lower right portion in FIG. 2) of the first upstream separator 30 and forms a portion of the hydrogen gas outlet passage 14. The through hole 33 extends through an upper portion of one longitudinal side (upper right portion in FIG. 2) of the first upstream separator 30 and forms a portion of the air inlet passage 13. The through hole 34 extends through a lower portion of the other longitudinal side (lower left portion in FIG. 2) of the first upstream separator 30 and forms a portion of the air outlet passage 15. The through hole 35 extends through one longitudinal side (left in FIG. 2) of the first upstream separator 30 and forms a portion of a coolant inlet passage 22, which distributes the coolant to the coolant flow passages so that the coolant flows into the coolant flow passages. The through hole 36 extends through the other longitudinal side (right in FIG. 2) of the first upstream separator 30 and forms a portion of the coolant outlet passage 23, which joins and discharges the coolant that has passed through the coolant flow passages. The through holes 31, 32, 33, 34, 35, 36 are defined by inner rims having recesses 31A, 32A, 33A, 34A, 35A, 36A, which are sunken in a direction away from the frame plate 50.

A recess 37 is formed in a longitudinally center portion of the first upstream separator 30. The formation range of the recess 37 includes a portion adjacent to the membrane electrode assembly 50A (indicated by broken lines in FIG. 2). The first upstream separator 30 and the frame plate 50 (refer to FIG. 1) are in tight contact with each other in the power generation cell 10. Thus, the recess 37 forms an empty space between the first upstream separator 30 and the frame plate 50 defining a portion of the hydrogen gas flow passages 10A, through which the hydrogen gas passes.

The bottom of the recess 37 includes a plurality of flow passage projections 38. The flow passage projections 38 are elongated and arranged beside each other. The flow passage projections 38 define the hydrogen gas flow passages 10A as a plurality of (ten in the present embodiment) branch passages 40, which individually communicate the hydrogen gas inlet passage 12 (through hole 31) and the hydrogen gas outlet passage 14 (through hole 32). More specifically, the branch passages 40 include a plurality of (ten in the present embodiment) inlet flow passages 41, which are individually connected to the hydrogen gas inlet passage 12, divergence flow passages 42, which divide each inlet flow passage 41 into a plurality of (eight in the present embodiment) passages, and a plurality of (eighty in the present embodiment) main flow passages 43, which are individually connected to the divergence flow passages 42 and extend parallel. The branch passages 40 further include convergence flow passages 44, which combine the main flow passages 43 into a plurality of (ten in the present embodiment) passages, and a plurality of outlet flow passages 45, which individually connect the combined convergence flow passages 44 to the hydrogen gas outlet passage 14. In the present embodiment, the shapes of the divergence flow passages 42 and the convergence flow passages 44 are determined so that hydrogen gas flowing into one branch passage 40 is distributed to eight main flow passages 43. In the present embodiment, the divergence flow passages 42 and the main flow passages 43 correspond to divisional passages.

Figure 3:
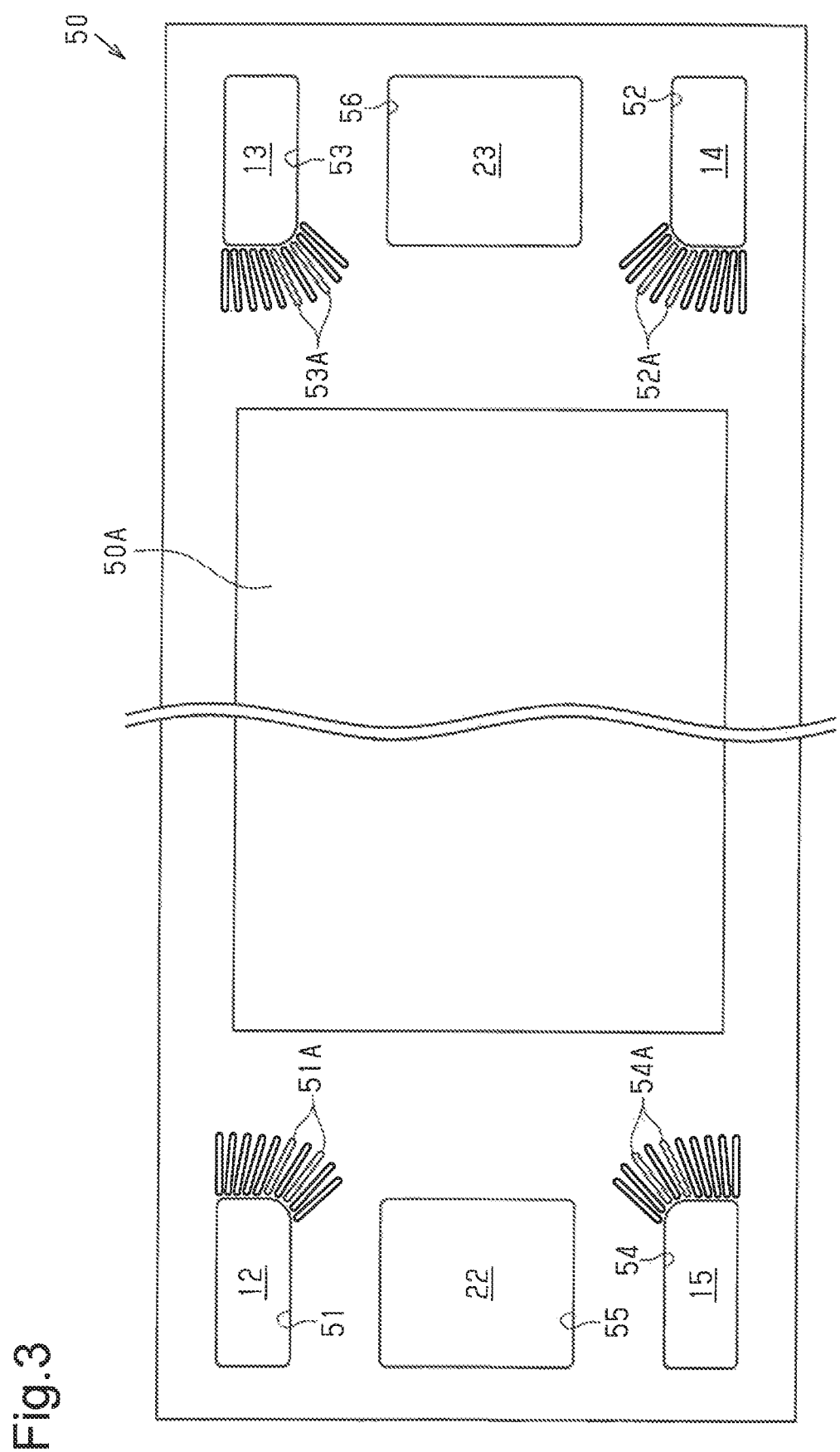
FIG. 3 is a plan view showing a frame plate of the power generation cell.

As shown in FIG. 3, the frame plate 50 includes through holes 51 to 56, which partially form the fluid flow passages (hydrogen gas inlet passage 12, air inlet passage 13, hydrogen gas outlet passage 14, air outlet passage 15, coolant inlet passage 22, and coolant outlet passage 23). In the power generation cell 10, the frame plate 50 and the first upstream separator 30 (refer to FIG. 2) are in tight contact with each other around the edges of the through holes 51 to 56. Thus, the hydrogen gas inlet passage 12, the air inlet passage 13, the hydrogen gas outlet passage 14, the air outlet passage 15, the coolant inlet passage 22, and the coolant outlet passage 23 are sealed between the facing surfaces of the frame plate 50 and the first upstream separator 30 against the outside.

However, as shown in FIGS. 2 and 3, the frame plate 50 includes a plurality of (ten in the present embodiment) elongated holes 51A extending from positions adjacent to the through hole 31 (more specifically, recess 31A) to positions adjacent to the recess 37. The elongated holes 51A are gaps that communicate the hydrogen gas inlet passage 12 (more specifically, through hole 31) and the recess 37 between the first upstream separator 30 and the first downstream separator 60 (refer to FIG. 1). In the present embodiment, each elongated hole 51A forms a portion of the hydrogen gas flow passages 10A (more specifically, portion of inlet flow passages 41 located toward hydrogen gas inlet passage 12).

The frame plate 50 also includes a plurality of (ten in the present embodiment) elongated holes 52A extending from positions adjacent to the through hole 32 (more specifically, recess 32A) to positions adjacent to the recess 37. The elongated holes 52A are gaps that communicate the hydrogen gas outlet passage 14 (more specifically, through hole 32) and the recess 37 between the first upstream separator 30 and the first downstream separator 60. In the present embodiment, each elongated hole 52A forms a portion of the hydrogen gas flow passages 10A (more specifically, portion of outlet flow passages 45 located toward hydrogen gas outlet passage 14).

Figure 4:
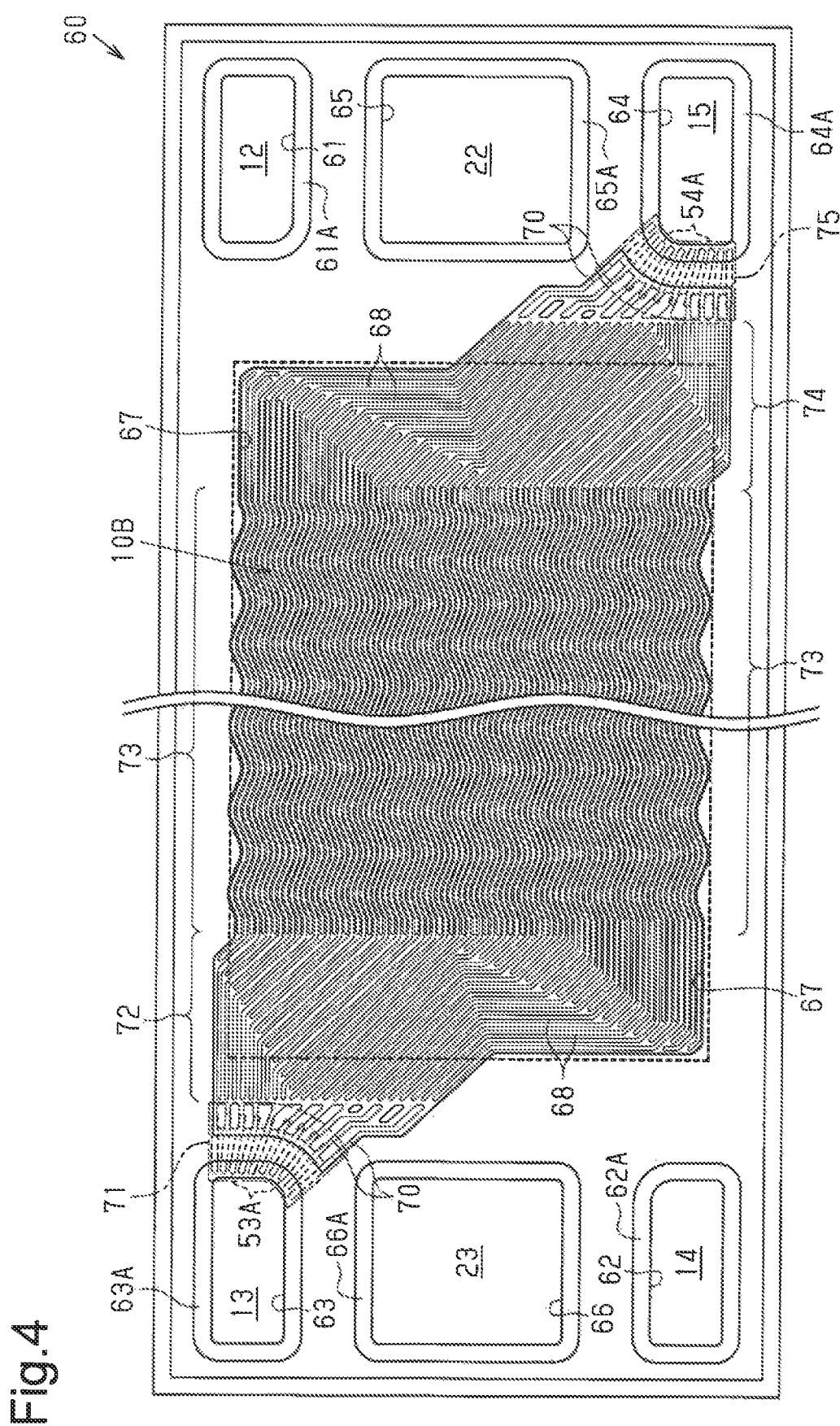
FIG. 4 is a plan view showing a first downstream separator of the power generation cell.

As shown in FIG. 4, the first downstream separator 60 is a thin metal plate member that has been pressed to have irregularities. The irregularities function to define gas flow passages (air flow passages 10B), which allow air to pass through the power generation cell 10, and a coolant flow passage. The shape of the first downstream separator 60 is basically a mirror image of the shape of the first upstream separator 30 (refer to FIG. 2). FIG. 4 shows the surface of the first downstream separator 60 facing the frame plate 50 (refer to FIG. 1).

The first downstream separator 60 includes through holes 61 to 66. The through hole 61 extends through an upper portion of one longitudinal side (upper right portion in FIG. 4) of the first downstream separator 60 and forms a portion of the hydrogen gas inlet passage 12. The through hole 62 extends through a lower portion of the other longitudinal side (lower left portion in FIG. 4) of the first downstream separator 60 and forms a portion of the hydrogen gas outlet passage 14. The through hole 63 extends through an upper portion of one longitudinal side (upper left portion in FIG. 4) of the first downstream separator 60 and forms a portion of the air inlet passage 13. The through hole 64 extends through a lower portion of the other longitudinal side (lower right portion in FIG. 4) of the first downstream separator 60 and forms a portion of the air outlet passage 15. The through hole 65 extends through one longitudinal side (right in FIG. 4) of the first downstream separator 60 and forms a portion of the coolant inlet passage 22. The through hole 66 extends through the other longitudinal side (left in FIG. 4) of the first downstream separator 60 and forms a portion of the coolant outlet passage 23. The through holes 61, 62, 63, 64, 65, 66 are defined by inner rims having recesses 61A, 62A, 63A, 64A, 65A, 66A, which are sunken in a direction away from the frame plate 50.

A recess 67 is formed in a longitudinally center portion of the first downstream separator 60. The formation range of the recess 67 includes a portion adjacent to the membrane electrode assembly 50A (indicated by broken lines in FIG. 4). The first downstream separator 60 and the frame plate 50 (refer to FIG. 3) are in tight contact with each other in the power generation cell 10. Thus, the recess 67 forms an empty space between the first downstream separator 60 and the frame plate 50 defining a portion of the air flow passages 10B, through which air passes.

The bottom of the recess 67 includes a plurality of flow passage projections 68. The flow passage projections 68 are elongated and arranged beside each other. The flow passage projections 68 define the air flow passages 10B as a plurality of (ten in the present embodiment) branch passages 70, which individually communicate the air inlet passage 13 (through hole 63) and the air outlet passage 15 (through hole 64). More specifically, the branch passages 70 include a plurality of (ten in the present embodiment) inlet flow passages 71, which are individually connected to the air inlet passage 13, divergence flow passages 72, which divide each inlet flow passage 71 into a plurality of (eight in the present embodiment) passages, and a plurality of main flow passages 73 (eighty in the present embodiment), which are individually connected to the divergence flow passages 72 and extend parallel. The branch passages 70 also include convergence flow passages 74, which combine the main flow passages 73 into a plurality of (ten in the present embodiment) passages, and a plurality of outlet flow passages 75, which individually connect the combined convergence flow passages 74 to the air outlet passage 15. In the present embodiment, the shapes of the divergence flow passages 72 and the convergence flow passages 74 are determined so that air flowing into one branch passage 70 is distributed to eight main flow passages 73. Thus, pressure loss is substantially uniform among the branch passages 70. While the main flow passages 43 (refer to FIG. 2) of the first upstream separator 30 linearly extend parallel at equal intervals, the main flow passages 73 of the first downstream separator 60 are undulated and extended beside each other at equal intervals.

In the power generation cell 10, the frame plate 50 (refer to FIG. 3) and the first downstream separator 60 (refer to FIG. 4) are in tight contact with each other around the edges of the frame plate 50 defining the through holes 51 to 56. Thus, the hydrogen gas inlet passage 12, the air inlet passage 13, the hydrogen gas outlet passage 14, the air outlet passage 15, the coolant inlet passage 22, and the coolant outlet passage 23 are sealed between the facing surfaces of the frame plate 50 and the first downstream separator 60 against the outside.

However, as shown in FIGS. 3 and 4, the frame plate 50 includes a plurality of (ten in the present embodiment) elongated holes 53A extending from positions adjacent to the through hole 63 (more specifically, recess 63A) to positions adjacent to the recess 67. The elongated holes 53A are gaps that communicate the air inlet passage 13 (more specifically, through hole 63) and the recess 67 between the first upstream separator 30 (refer to FIG. 2) and the first downstream separator 60. In the present embodiment, each elongated hole 53A forms a portion of the air flow passages 10B (more specifically, portion of inlet flow passages 71 located toward air inlet passage 13).

The frame plate 50 further includes a plurality of (ten in the present embodiment) elongated holes 54A extending from positions adjacent to the through hole 64 (more specifically, recess 64A) to positions adjacent to the recess 67. The elongated holes 54A are gaps that communicate the air outlet passage 15 (more specifically, through hole 64) and the recess 67 between the first upstream separator 30 and the first downstream separator 60. In the present embodiment, each elongated hole 54A forms a portion of the air flow passages 10B (more specifically, portion of outlet flow passages 75 located toward air outlet passage 15).

The coolant flow passages are defined between adjacent ones of the power generation cells 10 (refer to FIG. 1) in the fuel cell by the outer surface of the first upstream separator 30 of one power generation cell 10 and the outer surface of the first downstream separator 60 of the other power generation cell 10. The coolant flow passage is also defined between one of the end cells 11 (left in FIG. 1) and an adjacent power generation cell 10 by the outer surface of a second downstream separator 110 of the end cell 11 and the outer surface of the first upstream separator 30 of the power generation cell 10. The coolant flow passage is also defined between the other one of the end cells 11 (right in FIG. 1) and an adjacent power generation cell 10 by the outer surface of a second upstream separator 80 of the end cell 11 and the outer surface of the first downstream separator 60 of the power generation cell 10. The coolant flow passages are communicated to the coolant inlet passage 22 and the coolant outlet passage 23.

The structure of the end cells 11 will now be described.

As shown in FIG. 1, each end cell 11 has a structure in which a frame plate 100 is sandwiched between the second upstream separator 80 and the second downstream separator 110.

Figure 5:
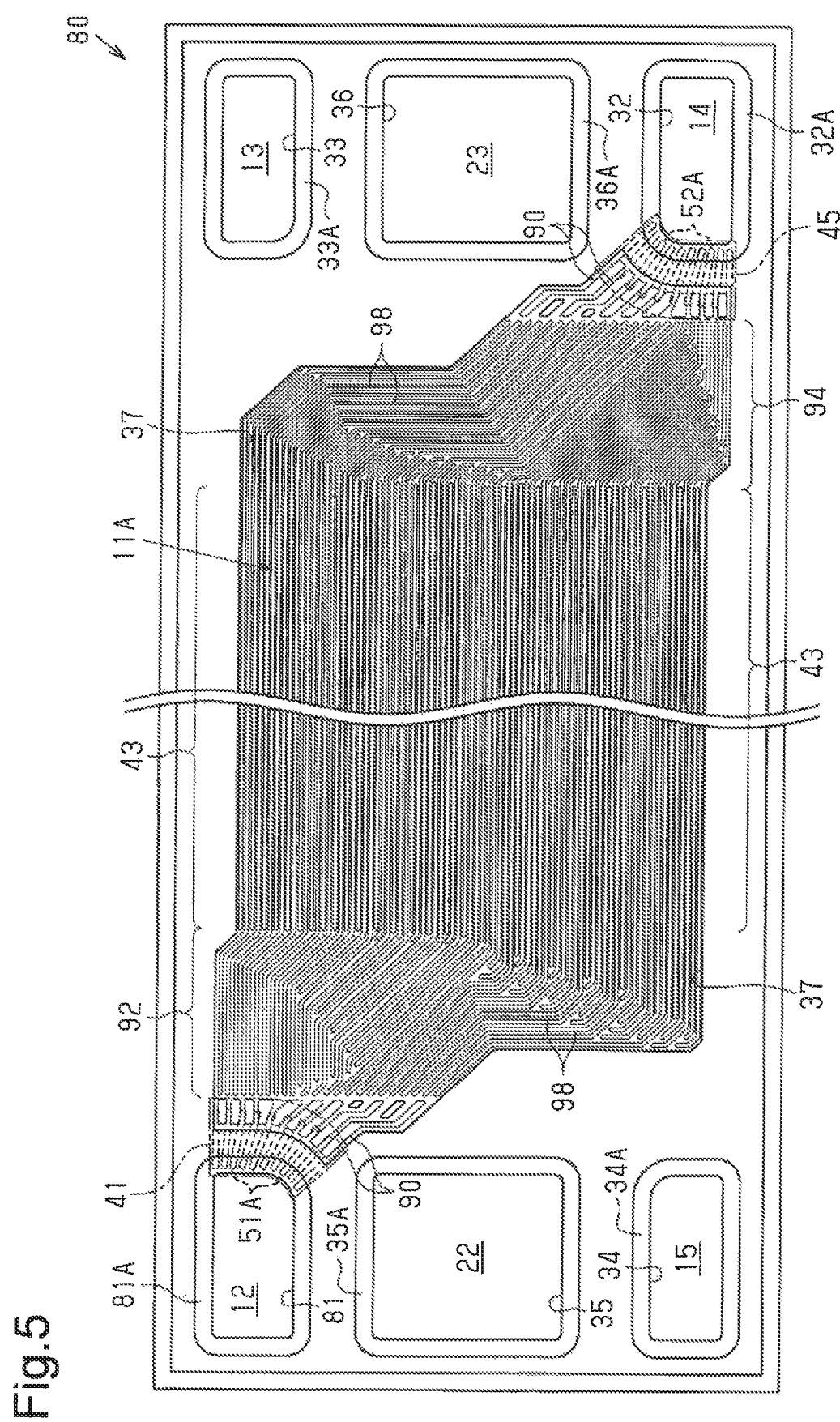
FIG. 5 is a plan view showing a second upstream separator of an end cell.

As shown in FIG. 5, the basic structure of the second upstream separator 80 is the same as that of the first upstream separator 30 (refer to FIG. 2). However, the first upstream separator 30 largely differs from the second upstream separator 80 in the shape of the through hole forming a portion of the hydrogen gas inlet passage 12 and the shapes of the divergence flow passages and the convergence flow passages partially forming the hydrogen gas flow passage. The description of the structure of the second upstream separator 80 will focus on the differences. The first upstream separator 30 and the second upstream separator 80 have the same structure except for the above-mentioned through hole, the divergence flow passages, and the convergence flow passages. The same reference characters are given to those elements having the same structure. Such elements will not be described in detail. FIG. 5 shows the surface of the second upstream separator 80 facing the frame plate 100 (refer to FIG. 1).

The second upstream separator 80 includes a through hole 81, which forms a portion of the hydrogen gas inlet passage 12. The through hole 81 is defined by an inner rim having a recess 81A, which is sunken in a direction away from the frame plate 100. The through hole 81 extends through an upper portion of one longitudinal side (upper left portion in FIG. 5) of the second upstream separator 80. The longitudinal direction conforms to the sideward direction in FIG. 5. The through hole 81 and the through hole 31 of the first upstream separator 30 (refer to FIG. 2) each define a rectangular opening with rounded corners. The lower edge of the rectangular opening of the through hole 81 is located at a lower position than that of the through hole 31 of the first upstream separator 30. Thus, the through hole 81 is downwardly wider than the through hole 31 of the first upstream separator 30.

The bottom of the recess 37 of the second upstream separator 80 includes a plurality of flow passage projections 98. The flow passage projections 98 define second flow passages (hereafter, referred to as the "bypass flow passages 11A"), which communicate the through hole 81 (hydrogen gas inlet passage 12) and the through hole 32 (hydrogen gas outlet passage 14) to allow the hydrogen gas to pass through, as a plurality of (ten in the present embodiment) branch passages 90. The branch passages 90 include divergence flow passages 92 and convergence flow passages 94, the shapes of which are determined so that upper ones (five in the present embodiment) of the branch passages 90 each distribute entered hydrogen gas to four main flow passages 43. Additionally, the shapes of the divergence flow passages 92 and the convergence flow passages 94 are determined so that lower ones (five in the present embodiment) of the entire branch passages 90 each distribute entered hydrogen gas to twelve main flow passages 43.

Figure 6:
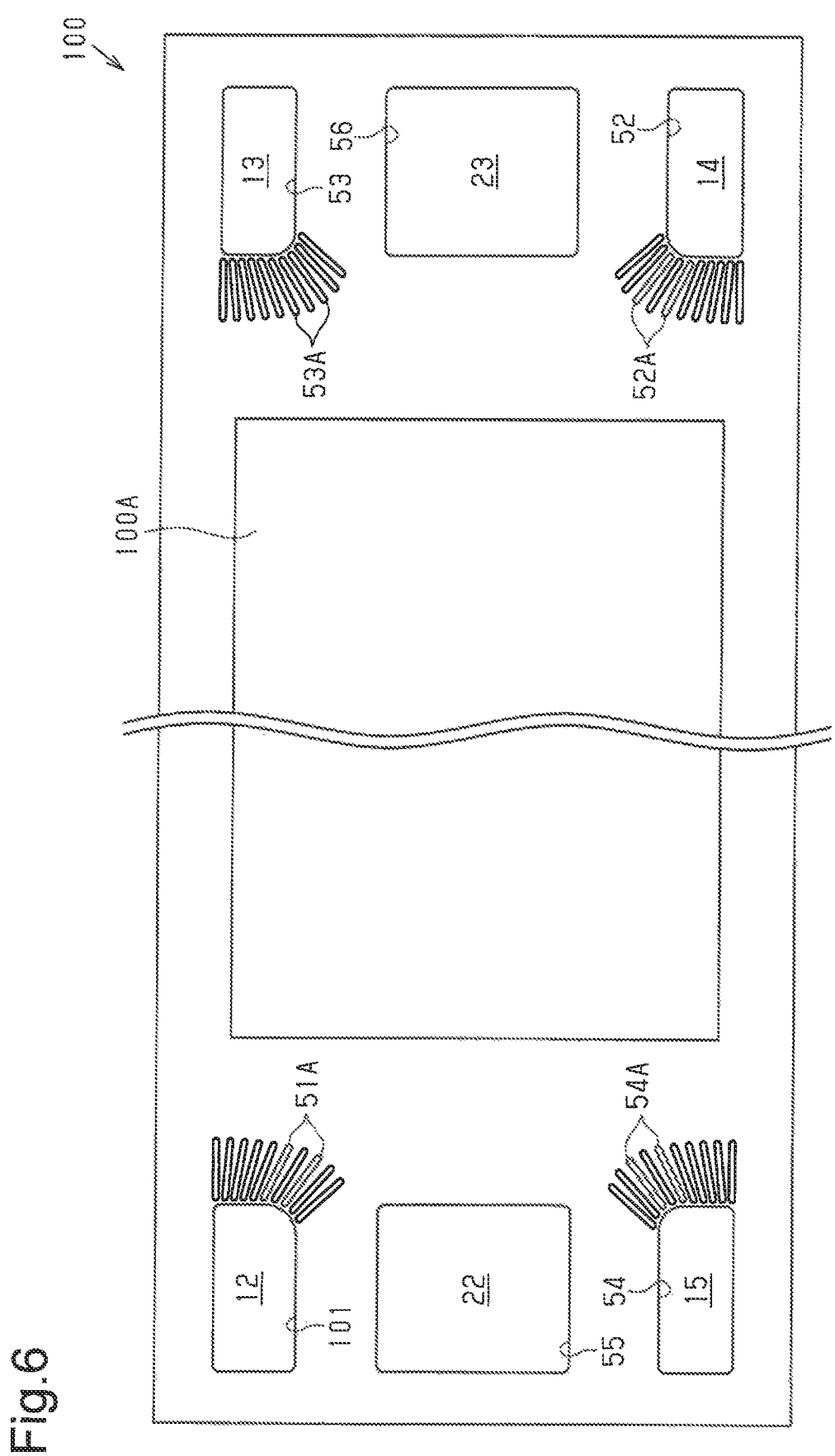
FIG. 6 is a plan view showing a frame plate of the end cell.

As shown in FIG. 6, the basic structure of the frame plate 100 is the same as that of the frame plate 50 (refer to FIG. 3). The frame plate 100 differs from the frame plate 50 in that the frame plate 100 includes a plate 100A instead of the membrane electrode assembly 50A and in the shape of a through hole 101 forming a portion of the hydrogen gas inlet passage 12. The description of the structure of the frame plate 100 will focus on the differences. In FIG. 6, the same reference characters are given to those elements having the same structure as the corresponding elements of the frame plate 50. Such elements will not be described in detail.

The plate 100A forms a central portion of the frame plate 100. The remaining portion of the frame plate 100 is formed by an insulator. The plate 100A has a three-layer structure in which a plate body formed by a non-air-permeable electrical conductor (metal plate in the present embodiment) and two carbon sheets sandwiching the plate body. The plate 100A is in contact with the second upstream separator 80 and the second downstream separator 110 to electrically connect the second upstream separator 80 and the second downstream separator 110. The end cells 11 allow hydrogen gas and air to pass through, but are not configured to generate power since they do not include the membrane electrode assembly 50A (refer to FIG. 1).

The frame plate 100 includes the through hole 101, which forms a portion of the hydrogen gas inlet passage 12, and the through holes 52 to 56. The through hole 10i extends through an upper portion of one longitudinal side (upper left portion in FIG. 6) of the frame plate 100. The longitudinal direction conforms to the sideward direction in FIG. 6. The through hole 101 and the through hole 51 of the frame plate 50 (refer to FIG. 3) each define a rectangular opening with rounded corners. The lower edge of the rectangular opening of the through hole 101 is located at a lower position than that of the through hole 51 of the frame plate 50. Thus, the through hole 101 has substantially the same shape as (more precisely, is slightly smaller than) the through hole 81 of the second upstream separator 80 and is downwardly wider than the through hole 51 of the frame plate 50.

In the end cell 11, the frame plate 100 and the second upstream separator 80 (refer to FIG. 5) are in tight contact with each other around the edges of the through holes 101 and 52 to 56. Thus, the hydrogen gas inlet passage 12, the air inlet passage 13, the hydrogen gas outlet passage 14, the air outlet passage 15, the coolant inlet passage 22, and the coolant outlet passage 23 are sealed between the facing surfaces of the second upstream separator 80 and the first frame plate 100 against the outside.

However, as shown in FIGS. 5 and 6, the frame plate 100 includes a plurality of elongated holes 51A extending from positions adjacent to the through hole 81 (more specifically, recess 81A) to positions adjacent to the recess 37. The elongated holes 51A are gaps that communicate the hydrogen gas inlet passage 12 (more specifically, through hole 81) and the recess 37 between the second upstream separator 80 and the second downstream separator 110. In the present embodiment, each elongated hole 51A of the frame plate 100 forms a portion of the inlet flow passages 41 of the bypass flow passages 11A located toward the hydrogen gas inlet passage 12.

The frame plate 100 further includes a plurality of elongated holes 52A extending from positions adjacent to the through hole 32 (more specifically, the recess 32A) to positions adjacent to the recess 37. The elongated holes 52A are gaps that communicate the hydrogen gas outlet passage 14 (more specifically, through hole 32) and the recess 37 between the second upstream separator 80 and the second downstream separator 110. In the present embodiment, each elongated hole 52A of the frame plate 100 forms a portion of the outlet flow passages 45 of the bypass flow passages 11A located toward the hydrogen gas outlet passage 14.

Figure 7:
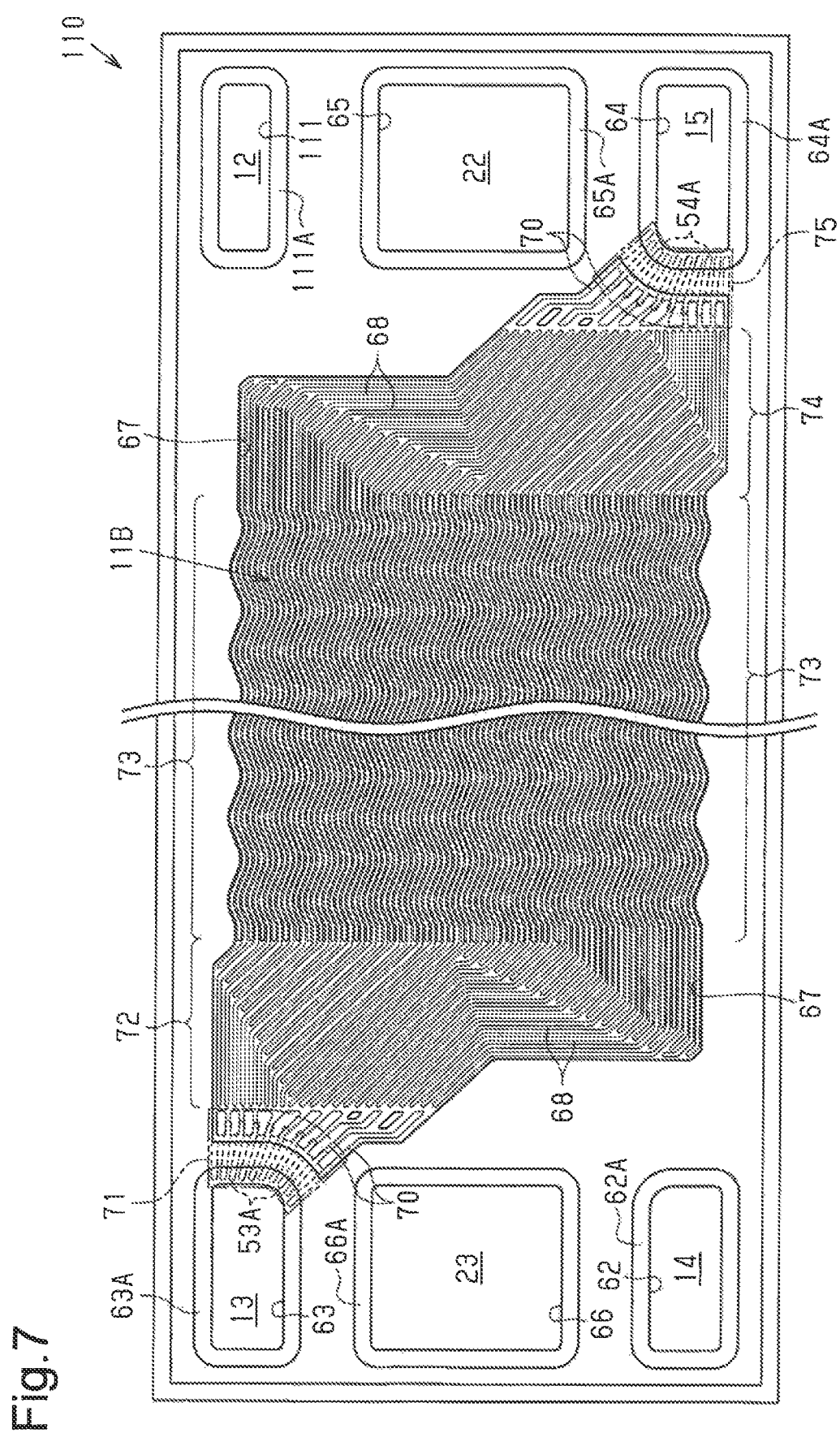
FIG. 7 is a plan view showing a second downstream separator of the end cell.

As shown in FIG. 7, the second downstream separator 110 and the first downstream separator 60 (refer to FIG. 4) have substantially the same structure. The description of the structure of the second downstream separator 110 will focus on the differences from the first downstream separator 60. In FIG. 7, the same reference characters are given to those elements having the same structure as the corresponding elements of the first downstream separator 60. Such elements will not be described in detail.

The second downstream separator 110 includes a through hole 111, which forms a portion of the hydrogen gas inlet passage 12, and through holes 62 to 66. The through hole 111 extends through an upper portion of one longitudinal side (upper left portion in FIG. 7) of the second downstream separator 110. The longitudinal direction conforms to the sideward direction in FIG. 7. The through hole 111 is defined by an inner rim having a recess 111A, which is sunken in a direction away from the frame plate 100. The through hole 111 and the through hole 61 of the first downstream separator 60 (refer to FIG. 4) each define a rectangular opening with rounded corners. The lower edge of the rectangular opening of the through hole 111 is located at a higher position than that of the through hole 61 of the first downstream separator 60. Thus, the through hole 111 is upwardly narrowed compared to the through hole 61 of the first downstream separator 60.

In the end cell 11, the second downstream separator 110 and the frame plate 100 (refer to FIG. 5) are in tight contact with each other around the edges of the through holes 111 and 62 to 66. Thus, the hydrogen gas inlet passage 12, the air inlet passage 13, the hydrogen gas outlet passage 14, the air outlet passage 15, the coolant inlet passage 22, and the coolant outlet passage 23 are sealed between the facing surfaces of the frame plate 100 and the second downstream separator 110 against the outside.

However, as shown in FIGS. 6 and 7, the frame plate 100 includes a plurality of elongated holes 53A extending from positions adjacent to the through hole 63 (more specifically, recess 63A) to positions adjacent to the recess 67. The elongated holes 53A are gaps that communicate the air inlet passage 13 (more specifically, through hole 63) and the recess 67 between the second upstream separator 80 and the second downstream separator 110. In the present embodiment, each elongated hole 53A of the frame plate 100 forms a portion of bypass flow passages 11B (refer to FIG. 1) that communicate the air inlet passage 13 and the air outlet passage 15 (more specifically, portion of inlet flow passages 71 located toward air inlet passage 13).

The frame plate 100 further includes a plurality of elongated holes 54A extending from positions adjacent to the through hole 64 (more specifically, recess 64A) to positions adjacent to the recess 67. The elongated holes 54A are gaps that communicate the air outlet passage 15 (more specifically, through hole 64) and the recess 67 between the second upstream separator 80 and the second downstream separator 110. In the present embodiment, each elongated hole 54A of the frame plate 100 forms a portion of the outlet flow passages 75 of the bypass flow passages 11B located toward the air outlet passage 15.

Figure 8:
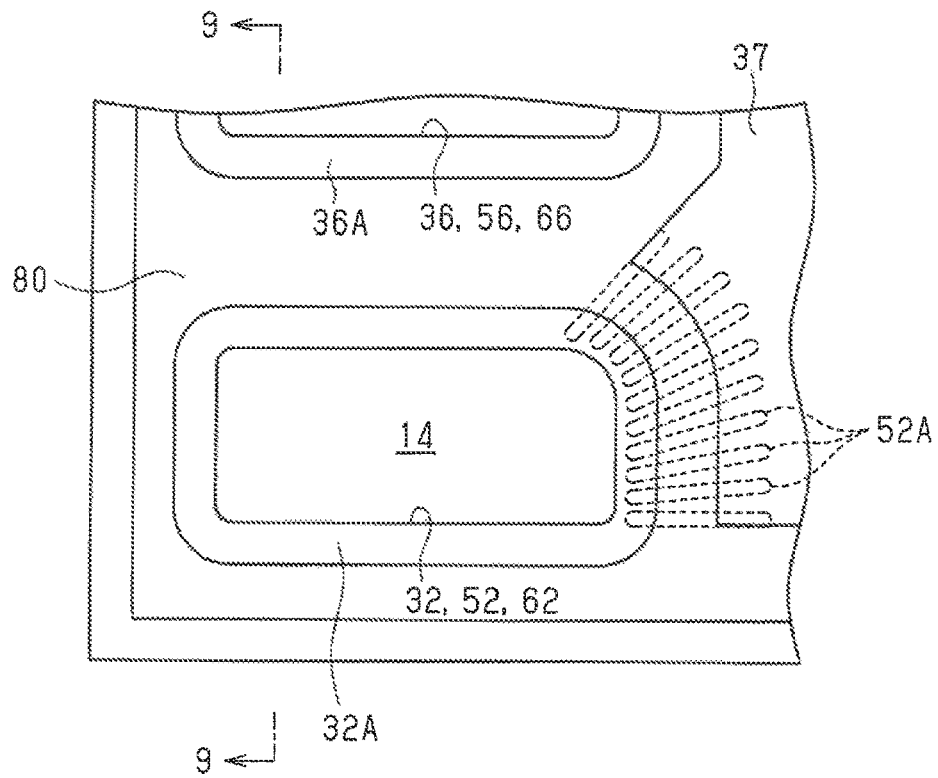
FIG. 8 is a plan view of a hydrogen gas outlet passage of the end cell and its vicinity taken from an outer side of the fuel cell.
Figure 9:
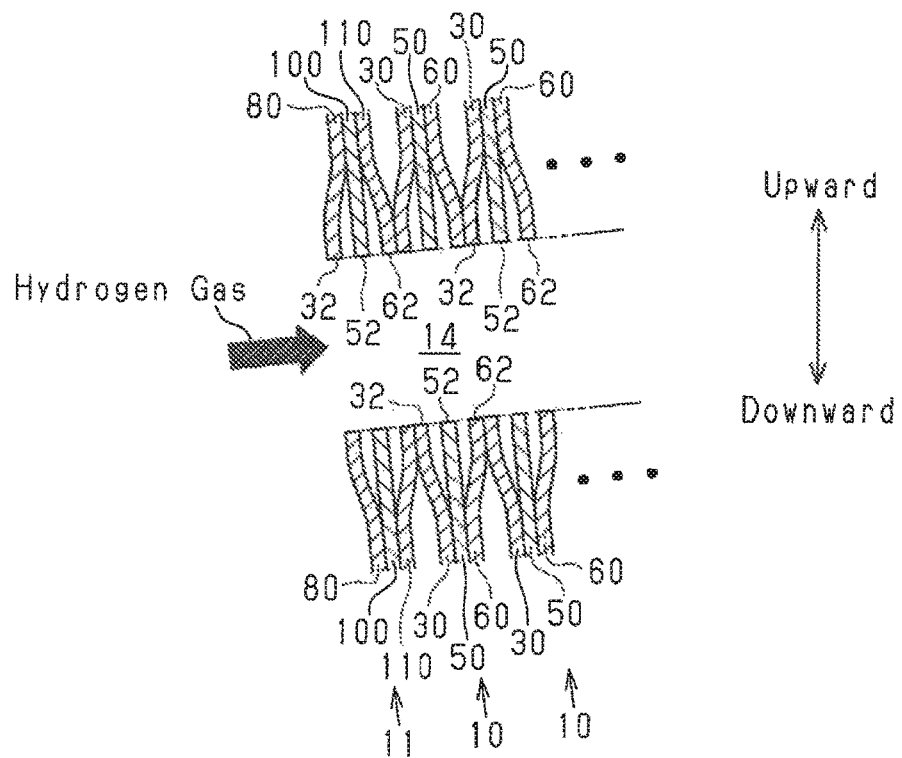
FIG. 9 is a cross-sectional end view of the fuel cell taken along line 9-9 shown in FIG. 8.

As shown in FIGS. 8 and 9, in the power generation cells 10 and the end cells 11, the through holes 32, 52, 62, which form the hydrogen gas outlet passage 14, have substantially the same shape. More specifically, the through hole 32 of the first upstream separator 30, the through hole 62 of the first downstream separator 60, the through hole 32 of the second upstream separator 80, and the through hole 62 of the second downstream separator 110 have the same shape. Additionally, the through hole 52 of the frame plate 50 and the through hole 52 of the frame plate 100 have the same shape and are slightly smaller than the through holes 32, 62. Similar to above, in the power generation cells 10 and the end cells 11, the through holes 33, 53, 63 forming the air inlet passage 13 have the same shape; the through holes 34, 54, 64 forming the air outlet passage 15 have the same shape; the through holes 35, 55, 65 forming the coolant inlet passage 22 have the same shape; and the through holes 36, 56, 66 forming the coolant outlet passage 23 have the same shape.

Figure 10:
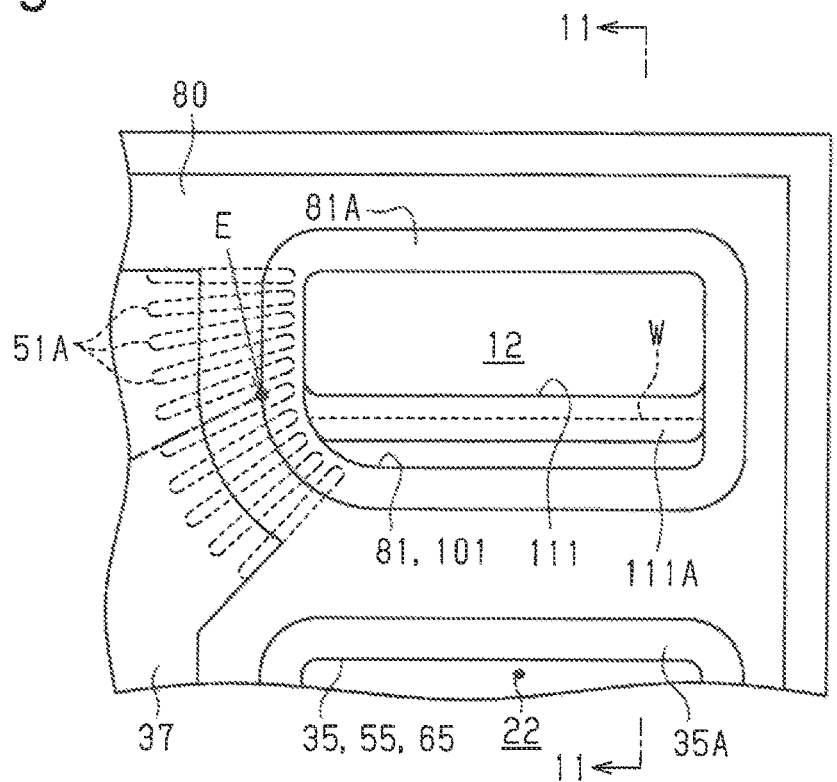
FIG. 10 is a plan view of a hydrogen gas inlet passage of the end cell and its vicinity taken from an outer side of the fuel cell.
Figure 11:
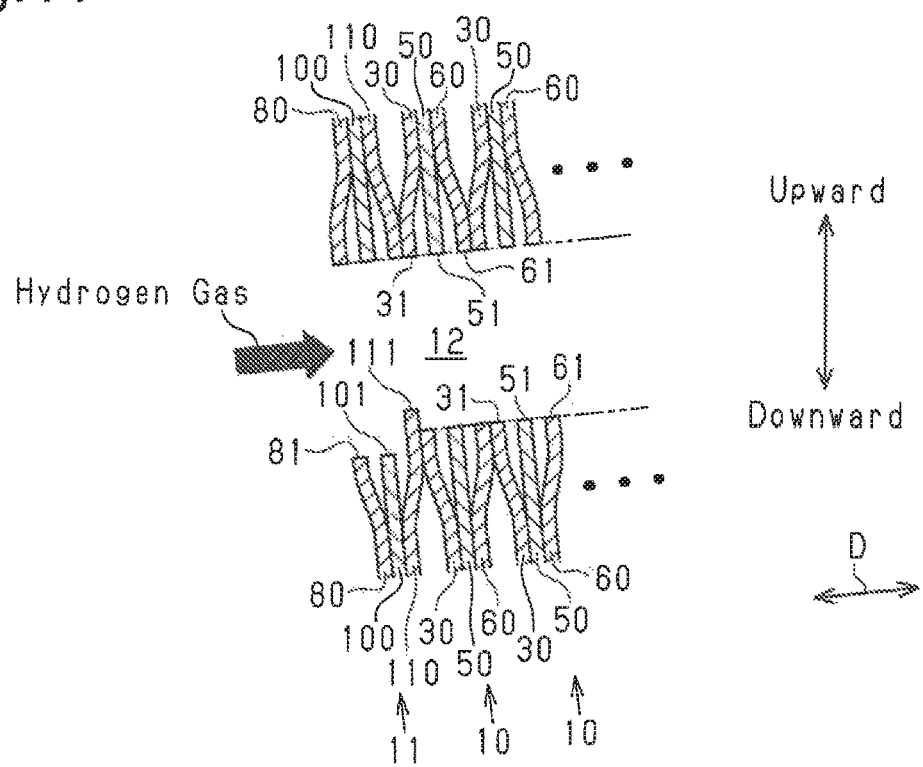
FIG. 11 is a cross-sectional end view showing the hydrogen gas inlet passage of the fuel cell taken along line 11-11 shown in FIG. 10.

In contrast, as shown in FIGS. 10 and 11, in the power generation cells 10 and the end cells 11, the through holes 31, 51, 61, 81, 101, 111 forming the hydrogen gas inlet passage 12 have different shapes.

More specifically, the through hole 81 of the second upstream separator 80 is downwardly wider than the through hole 31 of the first upstream separator 30. Additionally, the through hole 101 of the frame plate 100 has substantially the same shape as the through hole 81 of the second upstream separator 80 and is downwardly wider than the through hole 51 of the frame plate 50.

This forms a structure (first structure) in which the bottom wall of the through hole 81 of the second upstream separator 80 (i.e., portion corresponding to bottom wall of hydrogen gas inlet passage 12), which is located at the upstream side in a direction in which the hydrogen gas flows (hereafter, simply referred to as the "upstream side"), and the bottom wall of the through hole 101 of the frame plate 100 (i.e., portion corresponding to bottom wall of hydrogen gas inlet passage 12) are downwardly recessed compared to the corresponding portion of the power generation cells 10.

On the other hand, the through hole 111 of the second downstream separator 110 is narrowed compared to the through hole 61 of the first downstream separator 60 by upwardly projecting the bottom wall defining the through hole 111.

This forms a structure (second structure) in which the bottom wall of the through hole 111 of the second downstream separator 110 (i.e., portion corresponding to bottom wall of hydrogen gas inlet passage 12), which is located at the downstream side in a direction in which the hydrogen gas flows (hereafter, simply referred to as the "downstream side"), is upwardly projected compared to the corresponding portions of the power generation cells 10 (more specifically, bottom walls of through holes 61 of first downstream separators 60).

In FIG. 10, the line W indicates a water level (hereafter, referred to as the "maximum water level") obtained when water flows into the hydrogen gas inlet passage 12 at the maximum flow rate within an expected range with the fuel cell at rest. The maximum water level W is calculated by the inventors from the results of various kinds of tests and simulations.

As shown in FIG. 10, in the second downstream separator 110, the shape of the through hole 111 is determined so that the lower end of the through hole 111 is located above the maximum water level W.

Additionally, in the second upstream separator 80, the shapes of the branch passages 90 are determined so that the upper end (indicated by arrow E in FIG. 10) of the end portion of the uppermost one of the lower branch passages 90 (refer to FIG. 5) located toward the hydrogen gas inlet passage 12 is located above the maximum water level W. In FIG. 10, the single-dashed line indicates the border between the lower branch passages 90 and the upper branch passages 90.

The operation and advantages of the end cells 11 having the above structure will now be described.

The end cells 11 include the bypass flow passages 11A, which communicate the hydrogen gas inlet passage 12 and the hydrogen gas outlet passage 14. Thus, if water is produced in the hydrogen gas pipe 17 or the humidifier 20 and flows into the fuel cell (hydrogen gas inlet passage 12), the water is drawn into the end cell 11 by the hydrogen gas flowing from the hydrogen gas inlet passage 12 into the end cell 11 (more specifically, bypass flow passages 11A). This limits entrance of water into the power generation cells 10.

Additionally, as shown in FIG. 11, since the "first structure" is applied, the upstream portion of the hydrogen gas inlet passage 12 in the end cell 11 is shaped so that the bottom wall is downwardly recessed compared to the corresponding portions of the power generation cells 10 (more specifically, upstream portions of hydrogen gas inlet passage 12 in power generation cells 10). This forms a structure in which the upstream portion of the hydrogen gas inlet passage 12 in the end cell 11 is downwardly widened. Thus, the hydrogen gas flow is easily curved downward at the downwardly widened portion. This flow facilitates entrance of water (or water droplet) into the bypass flow passages 11A from the hydrogen gas inlet passage 12.

Additionally, since the "second structure" is applied, the downstream portion of the hydrogen gas inlet passage 12 in the end cell 11 is shaped so that the bottom wall upwardly projects compared to the corresponding portions of the power generation cells 10 (downstream portions of hydrogen gas inlet passage 12 in power generation cells 10). Thus, water (or water droplet) encounters the upward projection of the bottom wall of the hydrogen gas inlet passage 12. Consequently, the water falls downward and flows into the bypass flow passages 11A. Also, the hydrogen gas encounters the upward projection of the bottom wall, and the hydrogen gas flow partially deflects downward. The hydrogen gas flow guides water (or water droplet) into the bypass flow passages 11A.

As described above, the present embodiment has the "first structure" and the "second structure." This facilitates entrance of water into the bypass flow passages 11A of the end cell 11 to limit entrance of the water into the power generation cells 10. This advantage may be obtained when only one of the "first structure" and the "second structure" is applied.

In the fuel cell of the present embodiment, the hydrogen gas pipes 17 are connected to the end cell 11 located at one end (left in FIG. 1) in the stacking direction D via the stack manifold 16. Thus, when water enters the hydrogen gas inlet passage 12 from the hydrogen gas pipe 17 or the stack manifold 16, the water is drawn into the end cell 11 without reaching the power generation cells 10. This reduces the amount of water that reaches the power generation cells 10. Also, when an electric automobile is traveling, vibration or curves may cause water to enter the hydrogen gas inlet passage 12. The water may pass through the power generation cells 10 and reach the end cell 11 located farther from the stack manifold 16 (right in FIG. 1). In such a case, the water that has reached the end cell 11 is drawn into the bypass flow passages 11A of the end cell 11. Thus, the fuel cell of the present embodiment assuredly limits entrance of water into the power generation cells 10.

If water enters the bypass flow passages 11A of the end cell 11 and remains in the bypass flow passages 11A, the cross-sectional area of the bypass flow passages 11A (more specifically, branch passages 90 containing water) is reduced in accordance with the water. This may hinder hydrogen gas from flowing through the bypass flow passages 11A. In this case, water cannot be appropriately drawn from the hydrogen gas inlet passage 12 into the bypass flow passages 11A.

As shown in FIG. 5, in the bypass flow passages 11A of the end cell 11, each lower branch passage 90 distributes the hydrogen gas to a greater number of main flow passages 43 (more specifically, each lower branch passage 90 is connected to a greater number of main flow passages 43) than each upper branch passage 90 does. Thus, the integrated value of the cross-sectional areas of the (twelve) main flow passages 43 connected to the lower branch passages 90 is greater than integrated value of the cross-sectional areas of the (four) main flow passages 43 connected to the upper branch passages 90. Thus, among the branch passages 90 of the bypass flow passages 11A, the lower branch passages 90, where water easily enters, has a smaller pressure loss than the upper branch passages 90, where water does not easily enter.

Figure 12:
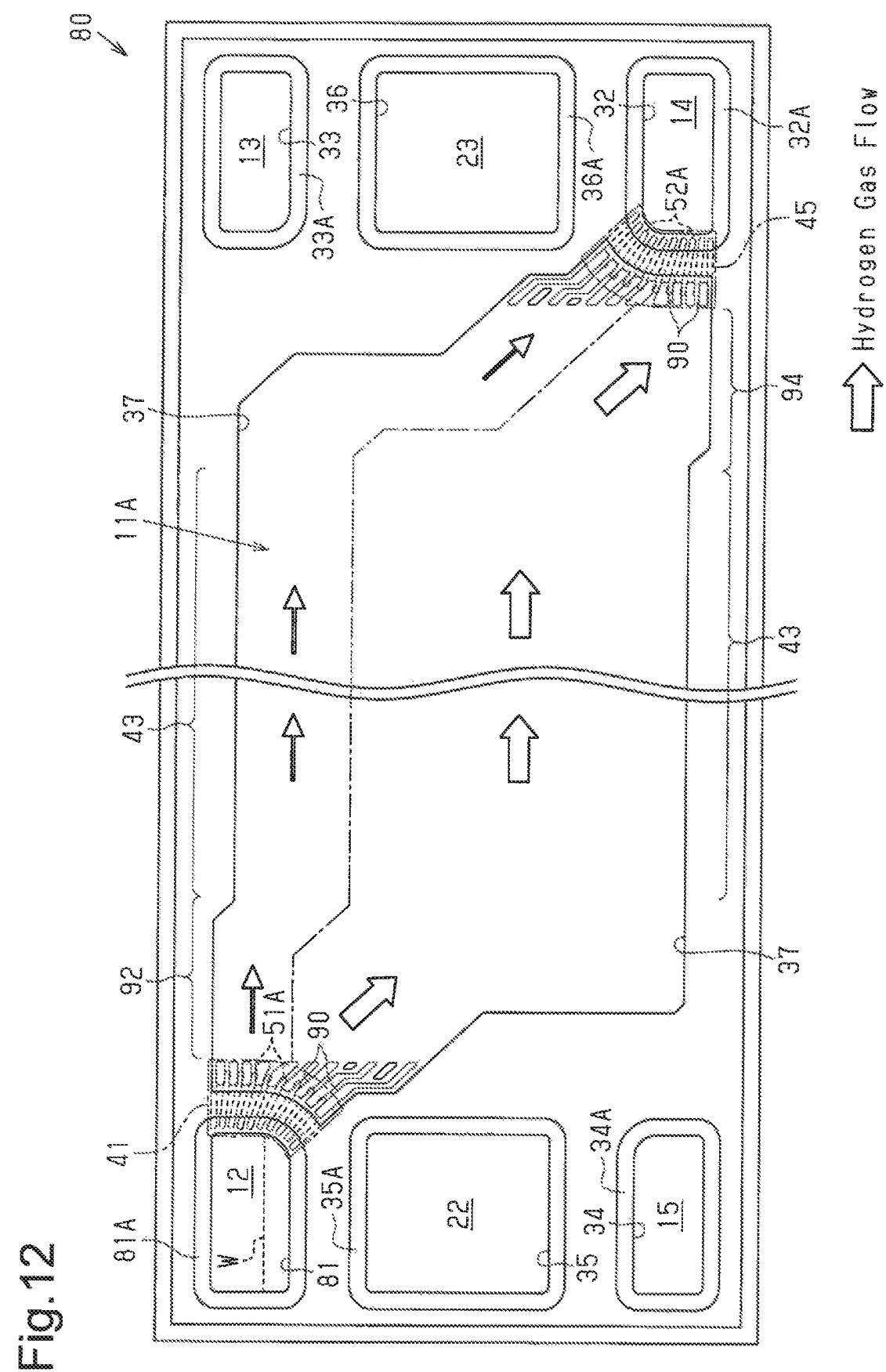
FIG. 12 is a plan view of the second upstream separator and a flow state of hydrogen gas in the power generation cell.

As schematically shown in FIG. 12, while the amount of hydrogen gas flowing into the upper branch passages 90 is decreased, the amount of the hydrogen gas flowing into the lower branch passages 90 is increased. Consequently, when water is drawn into the lower branch passages 90, the water is easily forced through the branch passages 90 by the relatively large amount of gas flowing into the branch passages 90. This limits water remaining in the branch passages 90 and maintains the function for drawing water into the bypass flow passages 11A. The single-dashed line of FIG. 12 indicates the border between the lower branch passages 90 and the upper branch passages 90.

Additionally, as shown in FIG. 2, in the hydrogen gas flow passages 10A of the power generation cell 10, each branch passage 40 distributes hydrogen gas to the same number of (eight) main flow passages 43. Thus, the integrated value of the cross-sectional areas of the (eight) main flow passages 43 is the same for each branch passage 40. This allows the branch passages 40 to have substantially the same pressure loss.

Figure 13:
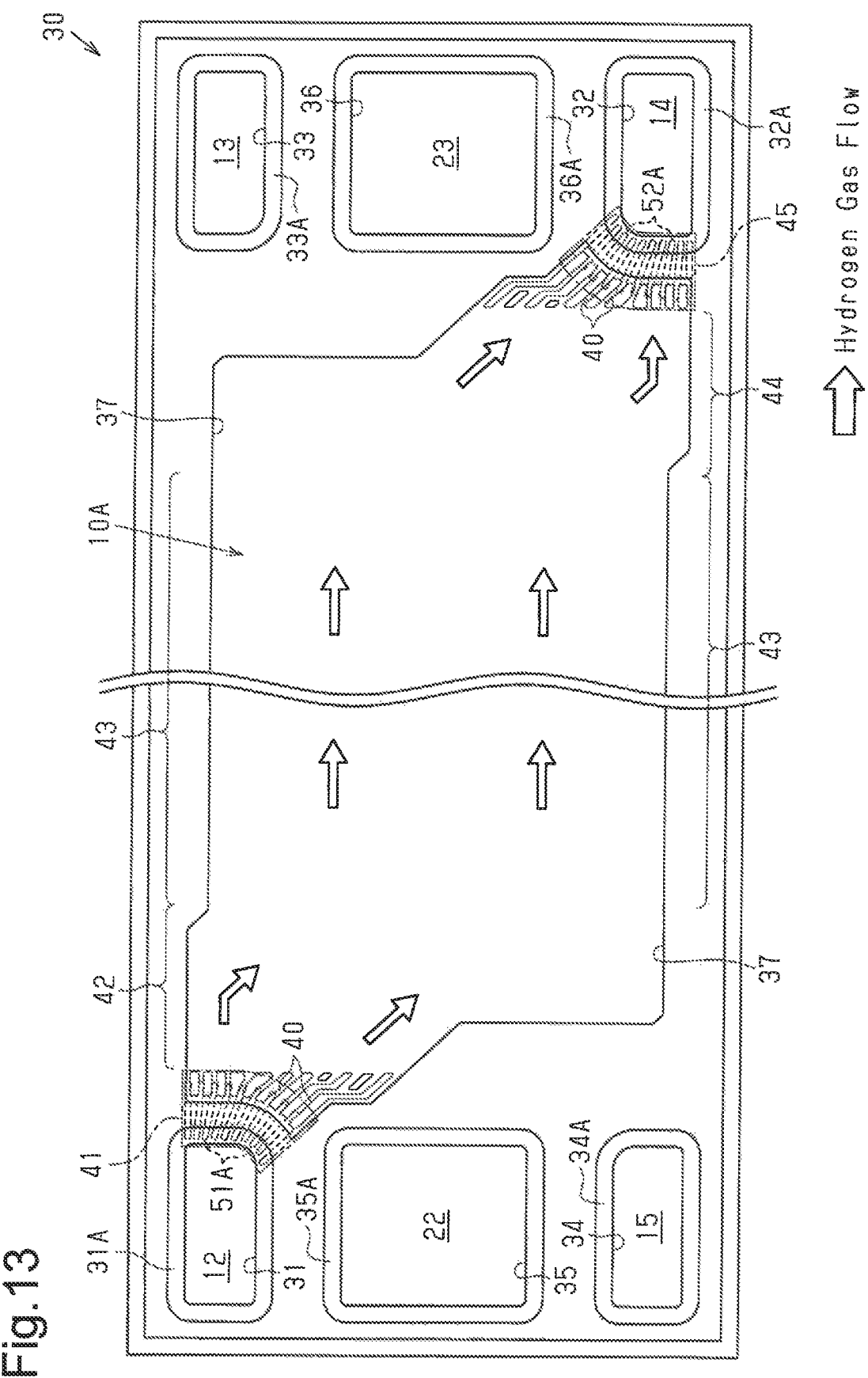
FIG. 13 is a plan view of the first upstream separator and a flow state of hydrogen gas in the power generation cell.

As schematically shown in FIG. 13, hydrogen gas evenly flows into the hydrogen gas flow passages 10A (each branch passage 40) of the power generation cell 10 in a uniform flow amount. On the other hand, as described above, hydrogen gas flows into the bypass flow passages 11A (refer to FIG. 12) of the end cell 11 in a manner such that hydrogen gas flowing into the upper branch passages 90 is limited to a small amount to increase the amount of hydrogen gas flowing into the lower branch passages 90. Therefore, among portions of the fuel cell (more specifically, branch passages 40 of power generation cell 10, lower branch passages 90 of end cell 11, and upper branch passages 90 of end cell 11) into which hydrogen gas flows from the hydrogen gas inlet passage 12, the largest amount of hydrogen gas flows into the lower branch passages 90 of the end cell 11. Consequently, water is easily drawn into the end cell 11 from the hydrogen gas inlet passage 12, thereby appropriately limiting entrance of water into the power generation cells 10.

As shown in FIG. 10, end portions of the five lower branch passages 90 of the end cell 11 located toward the hydrogen gas inlet passage 12 (left in FIG. 10) have an upper end E (more specifically, upper end of portions that communicate lower branch passages 90 and through hole 31). The upper end E is located above the maximum water level W. Thus, when water enters the hydrogen gas inlet passage 12 and reaches the end cell 11 (more specifically, portion that communicates hydrogen gas inlet passage 12 and bypass flow passages 11A), the water does not reach an end of the upper branch passages 90 but reaches an end of the lower branch passages 90, into which a large amount of hydrogen gas flows at a high speed. The flow of hydrogen gas into the lower branch passages 90 from the hydrogen gas inlet passage 12 is used to appropriately draw water from the hydrogen gas inlet passage 12 into the bypass flow passages 11A.

In the end cell 11, the upper end of the bottom wall of the through hole 111 of the second downstream separator 110 is located above the maximum water level W. Thus, when water enters the hydrogen gas inlet passage 12 and reaches the end cell 11 (portion that communicates bypass flow passages 11A and hydrogen gas inlet passage 12), the water encounters the inner edge of the second downstream separator 110 defining the through hole 111 and downwardly falls into the bypass flow passages 11A. In the present embodiment, when water reaches the end cell 11 through the hydrogen gas inlet passage 12, the water appropriately flows into the bypass flow passages 11A without passing beyond the end cell 11 toward the downstream side.

The present embodiment has the advantages described below.

(1) If water is produced in the hydrogen gas pipe 17 or the humidifier 20 and enters the hydrogen gas inlet passage 12, the water is drawn into the bypass flow passages 11A by hydrogen gas flowing from the hydrogen gas inlet passage 12 into the bypass flow passages 11A of the end cell 11. This limits entrance of the water into the power generation cells 10. Additionally, the upstream portion of the hydrogen gas inlet passage 12 in the end cell 11 is downwardly widened. The downstream portion of the hydrogen gas inlet passage 12 in the end cell 11 is shaped so that the bottom wall upwardly projects compared to the corresponding portions of the power generation cells 10. This forms a structure in which water easily enters the bypass flow passages 11A of the end cell 11. Thus, entrance of water into the power generation cells 10 is limited.

(2) The hydrogen gas pipes 17 are connected via the stack manifold 16 to the end cell 11 located at one end in the stacking direction D. Thus, when water enters the hydrogen gas inlet passage 12 from the hydrogen gas pipe 17, the water is drawn into the bypass flow passages 11A of the end cell 11 without reaching the power generation cells 10. This assuredly limits entrance of water into the power generation cells 10.

(3) In the end cell 11, the upper end of the bottom wall of the through hole 111 of the second downstream separator 110 is located above the maximum water level W. Thus, when water reaches the end cell 11 through the hydrogen gas inlet passage 12, the water appropriately enters the bypass flow passages 11A without passing beyond the end cell 11 toward the downstream side.

(4) Among the branch passages 90 of the bypass flow passages 11A, the pressure loss of the lower branch passages 90, where water easily enters, is decreased compared to the pressure loss of the upper branch passages 90, where water does not easily enter. Consequently, when water is drawn into the lower branch passages 90, the water is easily forced through the lower branch passages 90 by a relatively large amount of gas flowing into the branch passages 90. This limits water remaining in the branch passages 90 and maintains the function for drawing water into the bypass flow passages 11A.

(5) The end portion of the uppermost one of the lower branch passages 90 located toward the hydrogen gas inlet passage 12 has an upper end located above the maximum water level W. Thus, the flow of hydrogen gas into the lower branch passages 90 from the hydrogen gas inlet passage 12 is used to appropriately draw water into the bypass flow passages 11A from the hydrogen gas inlet passage 12.

Modified Examples

The above embodiment may be modified as follows.

The main flow passages 43 of the first upstream separator 30 and the second upstream separator 80 may be undulated and extended beside each other. The main flow passages 73 of the first downstream separator 60 and the second downstream separator 110 may linearly extend parallel.

The upper end of the bottom wall of the through hole 111 of the second downstream separator 110 may be located below the maximum water level W or may be located at the same height as the maximum water level W.

As long as the end cell 11 has at least one of the "first structure" and the "second structure," the through holes 81, 101, 111 of the end cell 11 forming the hydrogen gas inlet passage 12 may have an opening of any shape. In this case, in the "first structure," at least one of the bottom wall of the through hole of the second upstream separator and the bottom wall of the through hole of the frame plate of the end cell is downwardly recessed compared to the corresponding portion of the power generation cell. Also, in this case, in the "second structure," at least one of the bottom wall of the through hole of the frame plate of the end cell and the bottom wall of the through hole of the second downstream separator upwardly projects compared to the corresponding portion of the power generation cell. Specific examples of such a fuel cell will be described below.

Figure 14:
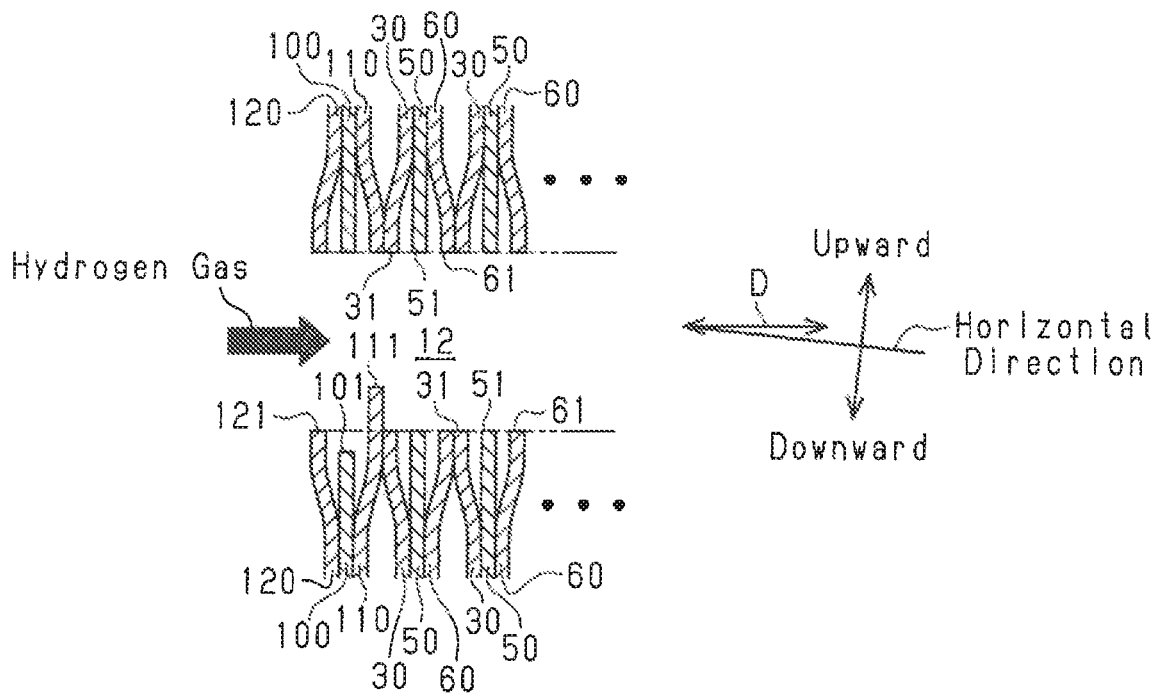
FIG. 14 is a cross-sectional end view of a hydrogen gas inlet passage along a stacking direction in a modified example of a fuel cell.

As shown in FIG. 14, a second upstream separator 120 may have a through hole 121 having the same shape as the through hole 31 of the first upstream separator 30. In FIG. 14, the same reference characters are given to those elements having the same structure as the corresponding elements of the end cell 11 (refer to FIG. 11) of the above embodiment. Such elements will not be described in detail.

Even with this structure, an upstream portion of the hydrogen gas inlet passage 12 in the end cell 11 is shaped so that the bottom wall is downwardly recessed compared to the corresponding portions of the power generation cells 10. Additionally, a downstream portion of the hydrogen gas inlet passage 12 in the end cell 11 is shaped so that the bottom wall upwardly projects compared to the corresponding portions of the power generation cells 10.

Figure 15:
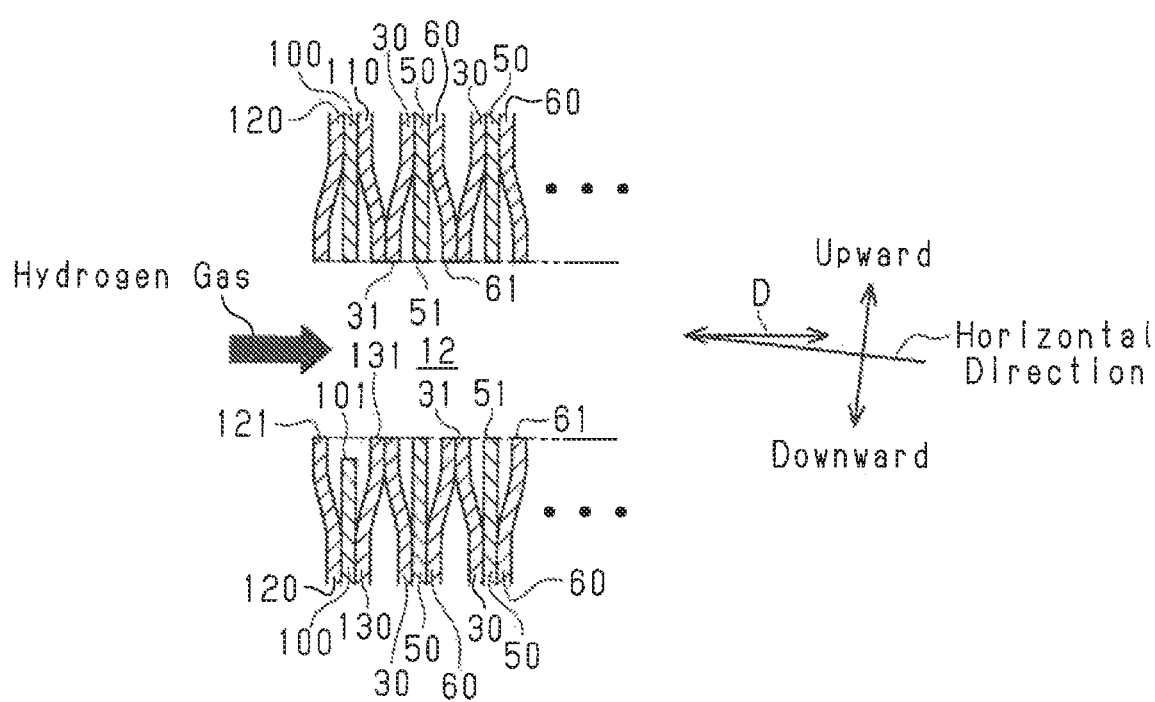
FIG. 15 is a cross-sectional end view of a hydrogen gas inlet passage along a stacking direction in another modified example of a fuel cell.

As shown in FIG. 15, the through hole 121 of the second upstream separator 120 may have the same shape as the through hole 31 of the first upstream separator 30, and a second downstream separator 130 may have a through hole 131 having the same shape as the through hole 61 of the first downstream separator 60. In FIG. 15, the same reference characters are given to those elements having the same structure as the corresponding elements of the end cell 11 (refer to FIG. 11) of the above embodiment. Such elements will not be described in detail.

Even with this structure, an upstream portion of the hydrogen gas inlet passage 12 in the end cell 11 is shaped so that the bottom wall is downwardly recessed compared to the corresponding portions of the power generation cells 10.

Additionally, in this structure, the inner rims of the through holes 121, 101, 131 forming the hydrogen gas inlet passage 12 do not project into the hydrogen gas inlet passage 12. This reduces the pressure loss of the hydrogen gas inlet passage 12.

Figure 16:
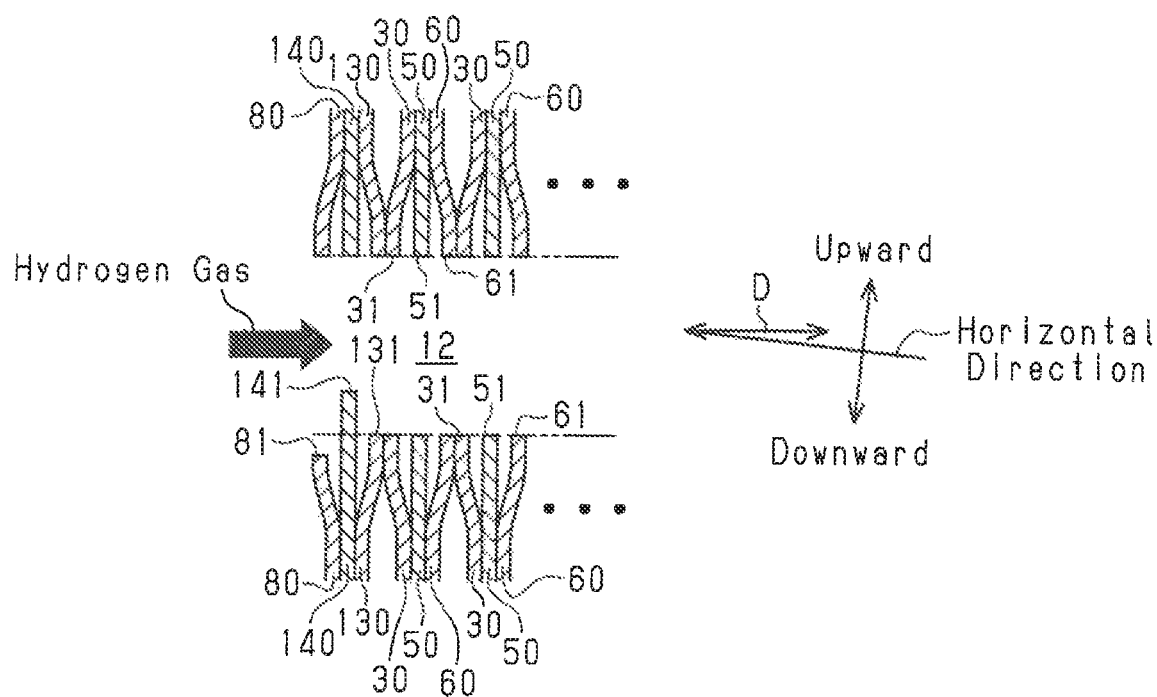
FIG. 16 is a cross-sectional end view of a hydrogen gas inlet passage along a stacking direction in another modified example of a fuel cell.

As shown in FIG. 16, a frame plate 140 may have a through hole 141 that is narrowed by upwardly projecting a bottom wall defining the through hole 141 as compared to the through holes 51 of the frame plates 50. Additionally, the through hole 131 of the second downstream separator 130 may have the same shape as the through hole 61 of the first downstream separator 60. In FIG. 16, the same reference characters are given to those elements having the same structure as the corresponding elements of the end cell 11 (refer to FIG. 11) of the above embodiment. Such elements will not be described in detail.

Even with this structure, an upstream portion of the hydrogen gas inlet passage 12 in the end cell 11 is shaped so that the bottom wall is downwardly recessed compared to the corresponding portions of the power generation cells 10. Additionally, a downstream portion of the hydrogen gas inlet passage 12 in the end cell 11 is shaped so that the bottom wall upwardly projects compared to the corresponding portions of the power generation cells 10.

The main flow passages 43, which partially form the bypass flow passages 11A, may have different widths and different heights to have different cross-sectional areas. This allows the branch passages 90 to have different pressure losses.

The end cell 11 may have a structure in which, instead of the frame plate 100, a plate or sheet formed from a porous material (e.g., carbon sheet having the same structure as gas diffusion layer) is sandwiched between the second upstream separator 80 and the second downstream separator 110. In this case, if the end cell is configured to allow both hydrogen gas and air to pass through, the flow of the hydrogen gas may interfere with the flow of the air in the end cell. Consequently, water may not be appropriately drawn into and discharged out of the end cell. Thus, in such a case, it is preferred that two end cells including an end cell configured to pass only hydrogen gas through and an end cell configured to pass only air through are arranged at opposite sides of the power generation cells 10 in the stacking direction D.

The upper end of the end portions of the lower branch passages 90 located toward the hydrogen gas inlet passage 12 may be located below the maximum water level W or may be located at the same height as the maximum water level W.

The second downstream separator of the end cell may have a basic structure that is a mirror image of the shape of the second upstream separator 80. For example, among the branch passages of the second downstream separator, lower ones of the branch passages may have a smaller pressure loss than upper ones of the branch passages. With this structure, if a fuel cell has a structure in which water may enter the air inlet passage from the air pipe, the water is drawn into the bypass flow passages by the air flowing from the air inlet passage into the bypass flow passages. Thus, entrance of water into the power generation cells is limited. Additionally, when water is drawn into the lower branch passages of the end cell, the water is easily forced through the branch passages by a relatively large amount of gas flowing into the branch passages. This limits water remaining in the branch passages and maintains the function for drawing water into the bypass flow passages.

Among the branch passages 90 forming the bypass flow passages 11A of the end cell 11, upper ones of the branch passages 90 and lower ones of the branch passages 90 may have the same pressure loss.

The same structure as the "first structure" and the "second structure" applied to the hydrogen gas inlet passage 12 may be applied to the air inlet passage 13.

In one example of the "first structure" applied to the air inlet passage 13, the through hole 33 of the second upstream separator 80 is downwardly widened compared to the through hole 33 of the first upstream separator 30, and also the through hole 53 of the frame plate 100 is downwardly widened compared to the through hole 53 of the frame plate 50. This forms a structure in which the bottom wall of the through hole 33 of the second upstream separator 80 (i.e., portion corresponding to bottom wall of air inlet passage 13), which is located at the upstream side in a direction in which air flows, and the bottom wall of the through hole 33 of the frame plate 100 are downwardly recessed compared to the corresponding portions of the power generation cells 10.

In one example of the "second structure" applied to the air inlet passage 13, the through hole 63 of the second downstream separator 110 is narrowed compared to the through hole 63 of the first downstream separator 60 by upwardly projecting a bottom wall defining the through hole 63. This forms a structure in which the bottom wall of the through hole 63 of the second downstream separator 110 (i.e., portion corresponding to bottom wall of air inlet passage 13), which is located at the downstream side in the air flow direction, upwardly projects compared to the corresponding portions of the power generation cells 10 (more specifically, bottom walls of through holes 63 of first downstream separators 60).

When the air inlet passage 13 has the "first structure" and the "second structure," if water enters the air inlet passage 13, the water easily enters the bypass flow passages 11B of the end cell 11. Thus, entrance of water into the power generation cells 10 is limited.

When the fuel cell includes a plurality of end cells, the end cell 11 of the fuel cell of the above embodiment may be applied to some of the plurality of end cells.

Two or more end cells 11 may be arranged at each end in the stacking direction D of the power generation cells 10.

The fuel cell of the above embodiment may also be applied to a fuel cell in which the end cell is arranged at only one end in the stacking direction D of the power generation cells 10.

The fuel cell of the above embodiment may also be applied to a fuel cell in which the humidifier 20 is not arranged in the hydrogen gas pipe 17.

The fuel cell of the above embodiment is not limited to a fuel cell installed in an electric automobile and may be applied to a fuel cell immovably fixed to the ground such as a residential fuel cell.

The above embodiments are intended to be illustrative, and the present invention is not limited to the above-described embodiments. Various alternatives, modifications and variations are possible to the disclosed exemplary embodiments without departing from the spirit and scope of the present invention. For example, the subject matter of the present invention may exist in fewer features than all of the features of the particular embodiments disclosed. The claims are incorporated into the detailed description and each claim by itself claims a separate embodiment. The scope of the invention is intended to embrace all such alternatives, modifications and variations, along with all equivalents thereof, within the scope of the claims.

The invention claimed is:

1. A fuel cell comprising:
a plurality of stacked power generation cells having a stacking direction coincident with a gas flow direction, wherein each power generation cell includes a first plate including a membrane electrode assembly, a first pair of separators sandwiching the first plate, and a first flow passage formed between the first plate and the first pair of separators to allow a power generating gas to pass through;
an end cell located at an upstream end in the gas flow direction of the plurality of stacked power generation cells, wherein the end cell includes a second plate, a second pair of separators sandwiching the second plate, and a second flow passage formed between the second plate and the second pair of separators to allow the power generating gas to pass through orthogonally with respect to the stacking direction; and
an inlet passage formed by through holes formed in the first pair of separators, the first plate, the second pair of separators, and the second plate, wherein the inlet passage extends in the stacking direction and distributes the power generating gas to the first flow passage and the second flow passage so that the power generating gas flows into the first flow passage and the second flow passage, wherein
the end cell has either of: a first structure; a second structure; or both a first structure and a second structure,
in the first structure, either of: a through hole formed in one separator of the second pair of separators located at an upstream side in the gas flow direction; a through hole formed in the second plate; or both the through hole formed in the one separator of the second pair of separators located at the upstream side and the through hole formed in the second plate has a bottom wall recessed orthogonally downward with respect to the stacking direction in comparison to a corresponding portion of each power generation cell, and
in the second structure, either of: the through hole formed in the second plate; the through hole formed in the one separator of the second pair of separators located at a downstream side in the gas flow direction; or both of the through hole formed in the second plate and the through hole formed in the one separator of the second pair of separators located at the downstream side has a bottom wall projecting orthogonally upward with respect to the stacking direction beyond a corresponding portion of each power generation cell.

2. The fuel cell according to claim 1, wherein the end cell has a gas supply passage connected thereto to allow the power generating gas to flow into the inlet passage from outside the inlet passage and has: either of: the first structure; the second structure; or both the first structure and the second structure.

3. The fuel cell according to claim 1, wherein
the end cell has the second structure, and
either of: the bottom wall of the through hole formed in the second plate; the bottom wall of the through hole formed in the one separator of the second pair of separators located at the downstream side in the gas flow direction; or both the bottom wall of the through hole formed in the second plate and the bottom wall of the through hole formed in the one separator of the second pair of separators located at the downstream side are located above a maximum water level of water entering the inlet passage.

4. The fuel cell according to claim 1, wherein
the second flow passage of the end cell includes a plurality of branch passages individually communicated to the inlet passage, and
a lower one of the plurality of branch passages has a smaller pressure loss than an upper one of the plurality of branch passages.

5. The fuel cell according to claim 4, wherein in the end cell, an end portion of the lower one of the plurality of branch passages located toward the inlet passage has an upper end located above a maximum water level of water entering the inlet passage.

* * * * *